(12) United States Patent
Si

(10) Patent No.: US 12,150,168 B2
(45) Date of Patent: Nov. 19, 2024

(54) METHOD AND APPARATUS OF CONTROL SIGNALING IN UNLICENSED SPECTRUM

(71) Applicant: Samsung Electronics Co., Ltd., Suwon-si (KR)

(72) Inventor: Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 17/660,820

(22) Filed: Apr. 26, 2022

(65) Prior Publication Data

US 2022/0386365 A1 Dec. 1, 2022

Related U.S. Application Data

(60) Provisional application No. 63/210,590, filed on Jun. 15, 2021, provisional application No. 63/185,856, filed on May 7, 2021.

(51) Int. Cl.
*H04W 74/00* (2009.01)
*H04L 5/00* (2006.01)
(Continued)

(52) U.S. Cl.
CPC ......... *H04W 74/006* (2013.01); *H04L 5/0048* (2013.01); *H04L 5/0053* (2013.01);
(Continued)

(58) Field of Classification Search
CPC ... H04W 74/006; H04W 72/23; H04W 16/14; H04W 74/0808; H04W 74/0833; H04L 5/0048; H04L 5/0053
See application file for complete search history.

(56) References Cited

U.S. PATENT DOCUMENTS

2019/0335433 A1 10/2019 Oh et al.
2020/0092861 A1 3/2020 Xu et al.
(Continued)

FOREIGN PATENT DOCUMENTS

EP 4021129 B1 8/2023
WO 2021066595 A1 4/2021

OTHER PUBLICATIONS

International Search Report and Written Opinion issued Aug. 8, 2022 regarding International Application No. PCT/KR2022/006172, 7 pages.
(Continued)

*Primary Examiner* — Chandrahas B Patel

(57) ABSTRACT

Methods and apparatuses for control signaling for an unlicensed spectrum band. A method of a user equipment (UE) in a wireless communication system includes receiving, from a base station (BS), a downlink control information (DCI) format and determining a type of channel access procedure based on a field in the DCI format. The type of channel access procedure is one of: a first type of channel access procedure that includes a random time duration for sensing; a second type of channel access procedure that includes a positive and deterministic time duration for sensing; or a third type of channel access procedure that does not include a time duration for sensing. The method further includes performing a channel access procedure based on the determined type of channel access procedure and transmitting an uplink transmission on a channel with shared spectrum channel access after performing the channel access procedure.

20 Claims, 6 Drawing Sheets

(51) Int. Cl.
  *H04W 16/14* (2009.01)
  *H04W 72/23* (2023.01)
  *H04W 74/0808* (2024.01)
  *H04W 74/0833* (2024.01)

(52) U.S. Cl.
  CPC .......... *H04W 16/14* (2013.01); *H04W 72/23* (2023.01); *H04W 74/0808* (2013.01); *H04W 74/0833* (2013.01)

(56) References Cited

U.S. PATENT DOCUMENTS

| | | | | |
|---|---|---|---|---|
| 2020/0374928 | A1* | 11/2020 | Xiong | H04W 74/0833 |
| 2020/0413485 | A1* | 12/2020 | Kundu | H04W 72/0446 |
| 2022/0159712 | A1 | 5/2022 | Myung et al. | |
| 2023/0354430 | A1* | 11/2023 | Lin | H04W 74/0808 |
| 2024/0008075 | A1* | 1/2024 | Kwak | H04L 5/0053 |

OTHER PUBLICATIONS

Moderator (Nokia), "Feature lead summary#1 on email discussion [102-e-NR-unlic-NRUChAcc-01]", 3GPP TSG RAN WG1 #102-e, R1-2007222, Aug. 2020, 50 pages.
"3rd Generation Partnership Project; Technical Specification Group Radio Access Network; NR; Multiplexing and channel coding (Release 16)", 3GPP TS 38.212 V16.5.0 (Mar. 2021), 152 pages.
Nokia et al., "Remaining Issues on Channel Access Procedures for NR-U", 3GPP TSG RAN WG1 #102-e, R1-2006370, Aug. 2020, 5 pages.
LG Electronics, "Remaining issues of channel access procedure for NR-U", 3GPP TSG RAN WG1 #102-e, R1-2006301, Aug. 2020, 8 pages.
"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)", 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
Extended European Search Report issued Jul. 24, 2024 regarding Application No. 22799060.3, 10 pages.
Ericsson, "Enhancements to initial access procedure", 3GPP TSG-RAN WG1 Meeting #99, R1-1912710, Nov. 2019, 24 pages.

\* cited by examiner

METHOD AND APPARATUS OF CONTROL SIGNALING IN UNLICENSED SPECTRUM

CROSS-REFERENCE TO RELATED APPLICATIONS AND CLAIM OF PRIORITY

The present application claims priority to U.S. Provisional Patent Application No. 63/185,856, filed on May 7, 2021, and U.S. Provisional Patent Application No. 63/210,590, filed on Jun. 15, 2021. The content of the above-identified patent documents are incorporated herein by reference.

TECHNICAL FIELD

The present disclosure relates generally to wireless communication systems and, more specifically, the present disclosure relates to control signaling for an unlicensed spectrum band in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to control signaling for an unlicensed spectrum band in a wireless communication system.

In one embodiment, a base station (BS) in a wireless communication system is provided. The BS includes a processor configured to determine a field in a downlink control information (DCI) format. The field includes information on a type of channel access procedure. The type of channel access procedure is one of: a first type of channel access procedure that includes a random time duration for sensing; a second type of channel access procedure that includes a positive and deterministic time duration for sensing; or a third type of channel access procedure that does not include a time duration for sensing. The BS further includes a transceiver operably coupled to the processor. The transceiver is configured to transmit, to a user equipment (UE), the DCI format over a channel with shared spectrum channel access and receive, from the UE, an uplink transmission on the channel with shared spectrum channel access after a channel access procedure performed based on the type of channel access procedure indicated in the DCI format.

In another embodiment, a user equipment (UE) in a wireless communication system is provided. The UE includes a transceiver configured to receive, from a BS, a DCI format and a processor operably coupled to the transceiver. The processor is configured to determine a type of channel access procedure based on a field in the DCI format. The type of channel access procedure is one of: a first type of channel access procedure that includes a random time duration for sensing; a second type of channel access procedure that includes a positive and deterministic time duration for sensing; or a third type of channel access procedure that does not include a time duration for sensing; and perform a channel access procedure based on the determined type of channel access procedure. The transceiver further configured to transmit an uplink transmission on a channel with shared spectrum channel access after performing the channel access procedure.

In yet another embodiment, a method of a UE in a wireless communication system is provided. The method includes receiving, from a BS, a DCI format and determining a type of channel access procedure based on a field in the DCI format. The type of channel access procedure is one of: a first type of channel access procedure that includes a random time duration for sensing; a second type of channel access procedure that includes a positive and deterministic time duration for sensing; or a third type of channel access procedure that does not include a time duration for sensing. The method further includes performing a channel access procedure based on the determined type of channel access procedure and transmitting an uplink transmission on a channel with shared spectrum channel access after performing the channel access procedure.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; and 3GPP TS 38.331 v16.1.0, "NR; Radio Resource Control (RRC) Protocol Specification."

Figure 1:
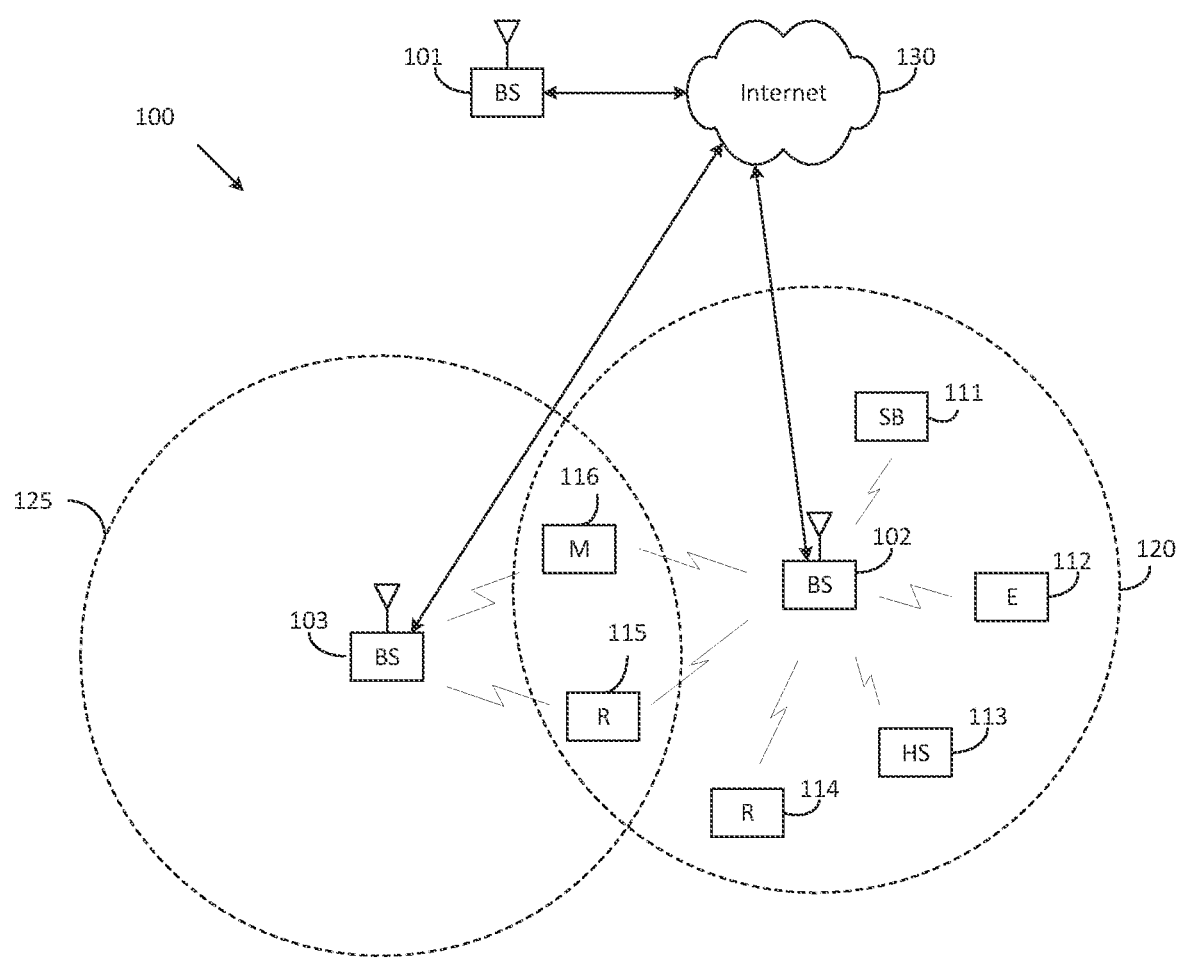
FIG. 1 illustrates an example of wireless network according to embodiments of the present disclosure.
Figure 2:
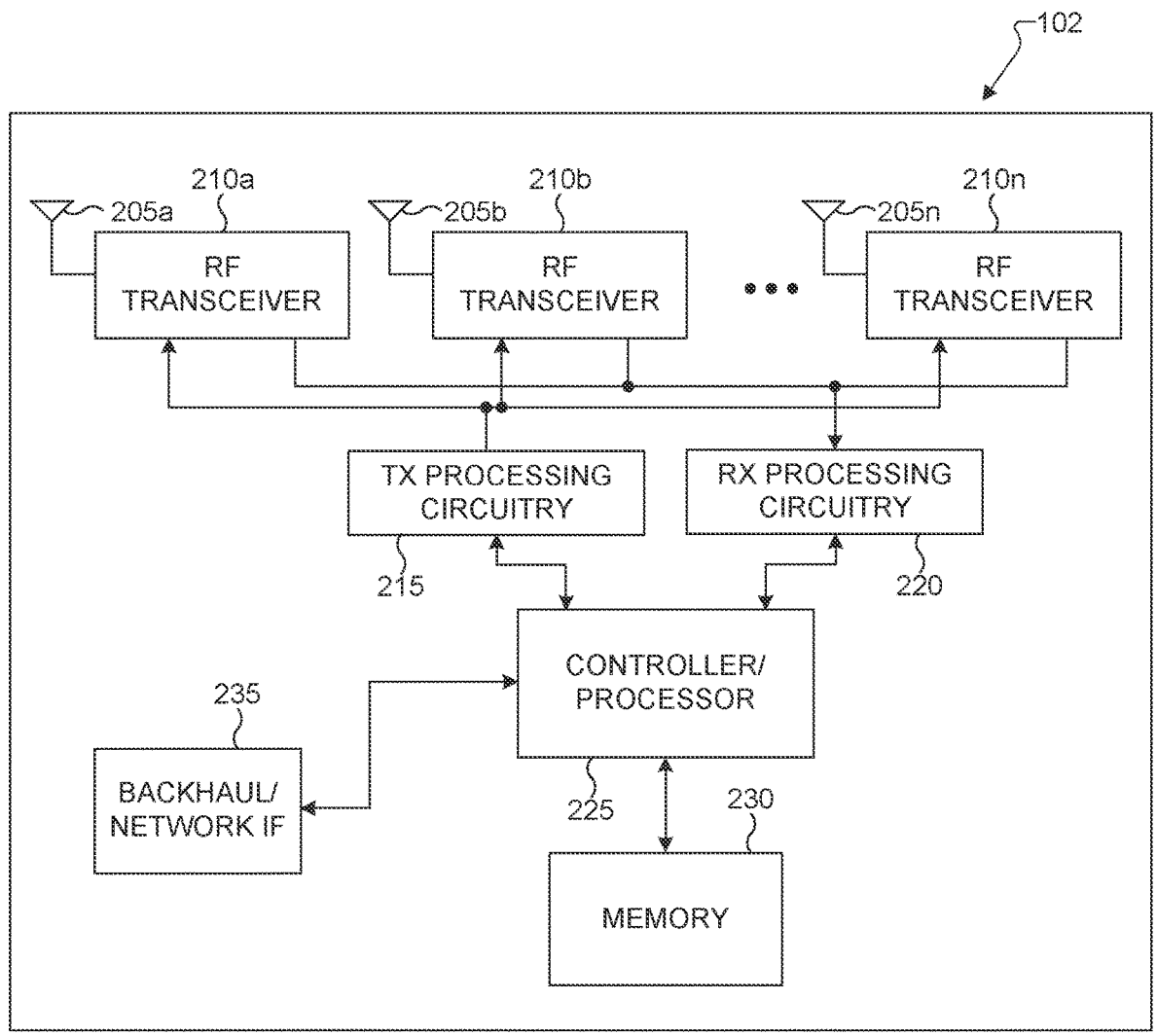
FIG. 2 illustrates an example of gNB according to embodiments of the present disclosure.
Figure 3:
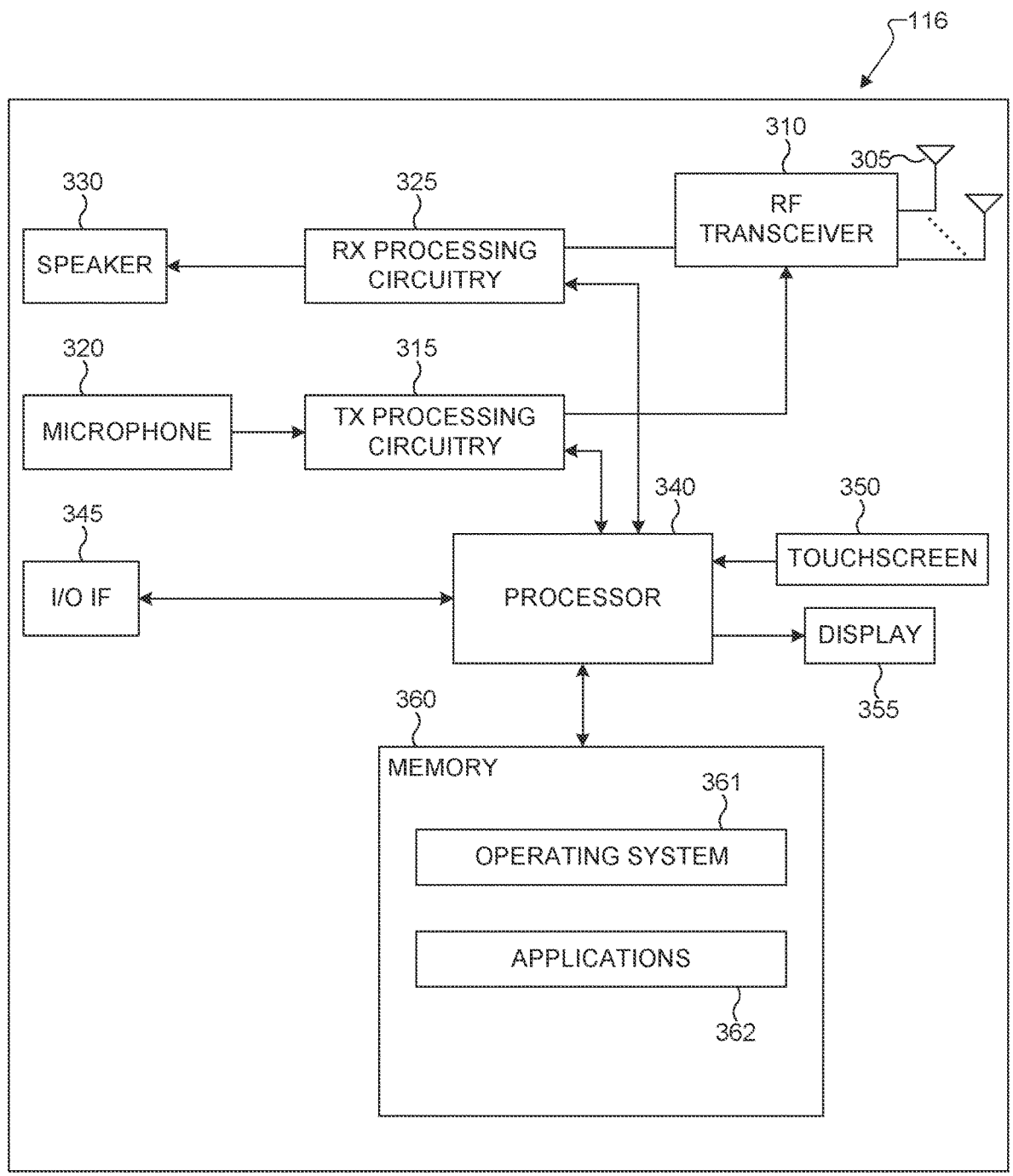
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for a short control signaling for an unlicensed spectrum band in a wireless communication system. In certain embodiments, and one or more of the gNBs 101-103 includes circuitry, programing, or a combination thereof, for a short control signaling for an unlicensed spectrum band in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a short control signaling for an unlicensed spectrum band in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a short control signaling for an unlicensed spectrum band in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
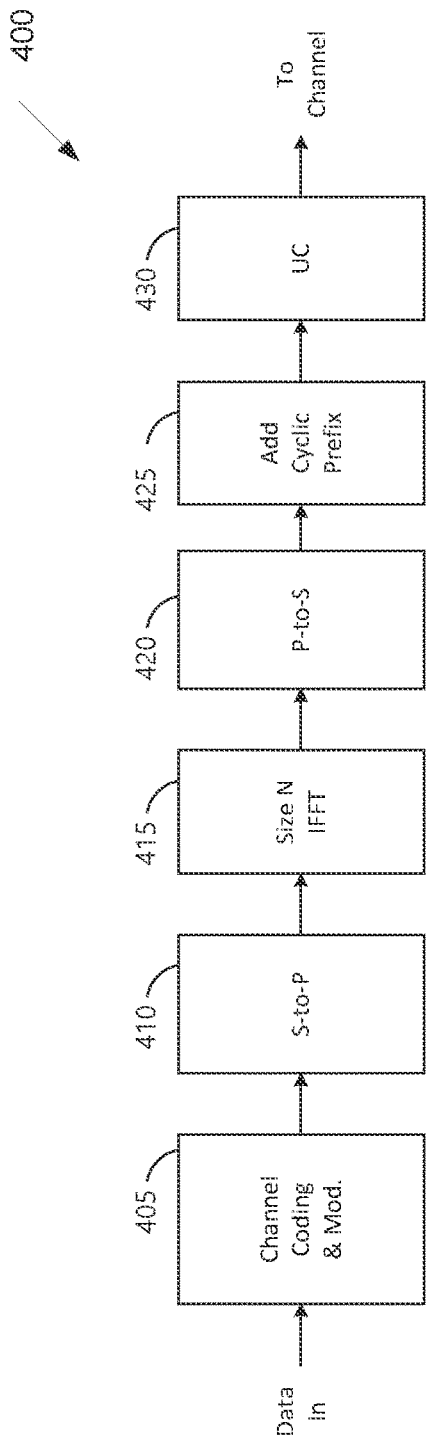
FIGS. 4 and 5 illustrate example of wireless transmit and receive paths according to this disclosure.
Figure 5:
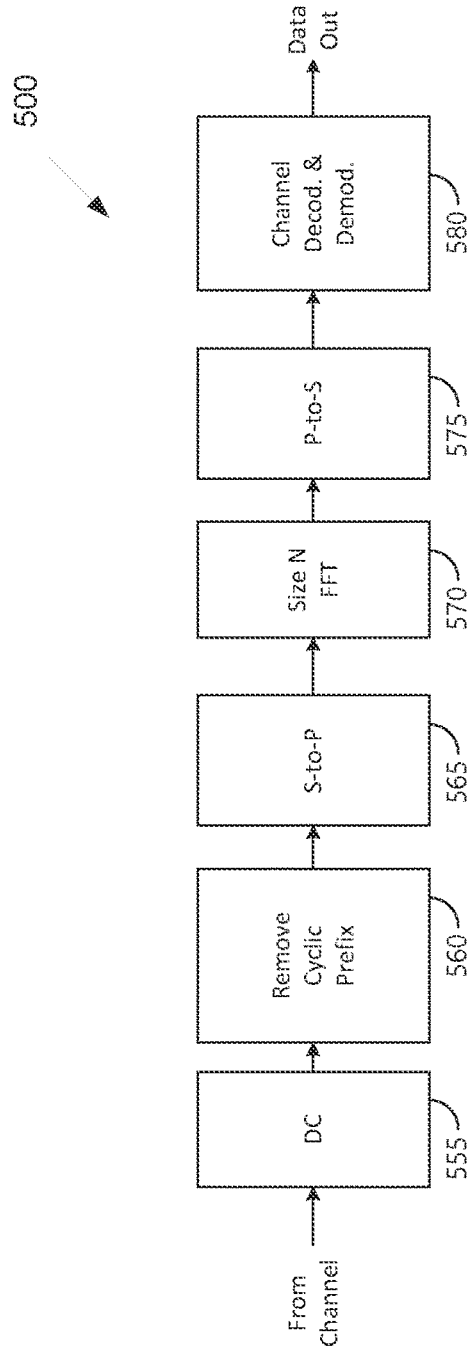

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

For 60 GHz unlicensed spectrum, for the region requiring channel sensing for initializing a channel occupancy, there is an exemption rule specified in the regulation, wherein for a type of signals and/or channels, their transmission can be exempt from channel sensing, when certain condition on the duty cycle is satisfied. This type of signals and/or channels is referred to as "short control signaling" in the regulation.

For NR, when supporting 60 GHz unlicensed spectrum, the same principle could be applicable, in order to prioritize the transmission of such signals and/or channels. However, there are design details to be considered for a centralized system like NR, e.g., how to define the content of short control signaling, and how to indicate to the UE.

A "short control signaling" can also be referred to as other equivalent terminology, e.g., "channel sensing exempted transmission," "channel sensing exempted signal/channel," "channel sensing exempted burst" etc.

The present disclosure provides the supporting of short control signaling for an unlicensed spectrum band. More precisely, the following aspects are included in the present disclosure: (1) components for short control signaling: (i) components for DL short control signaling and (ii) components for UL short control signaling; (2) an indication of short control signaling: (i) an indication of DL short control signaling, (ii) an indication of UL short control signaling, and (iii) a joint indication of DL and UL short control signaling; (3) limitation on the duty cycle when supporting short control signaling: (i) limitation on the duty cycle when supporting DL short control signaling, (ii) limitation on the duty cycle when supporting UL short control signaling, and (iii) limitation on the duty cycle when jointly supporting DL and UL short control signaling; and (4) a UE procedure for supporting short control signaling.

In one embodiment, a DL signal and/or channel can be included as part of the short control signaling. The content of DL short control signaling can include at least one of the following components.

In one example of a first component, a set of synchronization signal/physical broadcasting channel (SS/PBCH) blocks can be included as part of the short control signaling.

In one example of a second component, PDCCH and PDSCH of remaining minimum system information (RMSI) can be included as part of the short control signaling.

In one example of a third component, CSI-RS can be included as part of the short control signaling. In one further condition, the CSI-RS can be required to be quasi co-located (QCLed) with SS/PBCH block to be included as part of the short control signaling. In another further condition, the CSI-RS can be required to be within the slots containing SS/PBCH block to be included as part of the short control signaling. In yet another further condition, the CSI-RS can be required to be within the symbols containing SS/PBCH block to be included as part of the short control signaling.

In one example of a fourth component, PDCCH and PDSCH carrying broadcast information can be included as part of the short control signaling. In one further condition, the PDCCH and PDSCH can be required to be QCLed with SS/PBCH block to be included as part of the short control signaling. In another further condition, the PDCCH and PDSCH can be required to be within the slots containing SS/PBCH block to be included as part of the short control signaling. In yet another further condition, the PDCCH and PDSCH can be required to be within the symbols containing SS/PBCH block to be included as part of the short control signaling.

In one example of a fifth component, any periodic DL reference signal can be included as part of the short control signaling.

In one example of a sixth component, any periodic DL signal and channel can be included as part of the short control signaling.

In one instance, at least one of the components can be as part of the short control signaling independently and being part of the short control signaling does not need a pre-condition of other components being as part of the short control signaling.

In another instance, at least one of the components has a higher priority than other components to be as part of the short control signaling and including the at least one of components as part of the short control signaling is a pre-condition for other components to be as part of the short control signaling.

For example, at least for a DL, a short control signaling may at least include a set of SS/PBCH blocks, and other components can be further multiplexed with the set of SS/PBCH blocks as part of the short control signaling.

In one example, the DL short control signaling needs to be a contiguous burst, e.g., there is no gap within the short control signaling within a periodicity, or the gap(s) within the burst of short control signaling is smaller than a pre-defined threshold.

In another example, a gNB can transmit component(s) in the DL short control signaling without performing channel access procedure, and a UE can assume the gNB transmits component(s) in the DL short control signaling without performing channel access procedure.

In one embodiment, there can be an indication of the components for DL short control signaling.

For one example, there can be a cell-specific indication of the components for DL short control signaling. For example, the cell-specific indication can be in system information, e.g., master information block (MIB), or system information block 1 (SIB1) (RMSI), or SIBx (OSI). For another example, the cell-specific indication can be in RRC parameter.

For another example, there can be a UE-specific indication of the components for DL short control signaling. For example, the UE-specific indication can be in RRC parameter.

In one example, the indication can include the components for DL short control signaling.

In one example, an indication of components for DL short control signaling is shown in TABLE 1, wherein all the rows or a subset of rows can be supported. This example can be applicable when there is no pre-condition on requiring an SS/PBCH block to be part of the short control signaling.

TABLE 1

Example indication of components for DL short control signaling

| Index | Components |
| --- | --- |
| 0 | No component in DL short control signaling |
| 1 | Only SS/PBCH block |
| 2 | Only PDCCH/PDSCH of RMSI |
| 3 | Only CSI-RS |
| 4 | Discovery burst (e.g., SS/PBCH block + PDCCH/PDSCH of RMSI + CSI-RS) |
| 5 | Discovery burst + PDCCH/PDSCH carrying broadcast information |

In another example, an indication of components for DL short control signaling is shown in TABLE 2, wherein all the rows or a subset of rows can be supported. This example can be applicable when there is a pre-condition on requiring SS/PBCH block to be part of the short control signaling.

TABLE 2

Example indication of components for DL short control signaling

| Index | Components |
| --- | --- |
| 0 | No component in DL short control signaling |
| 1 | Only SS/PBCH block |
| 2 | Discovery burst (e.g., SS/PBCH block + PDCCH/PDSCH of RMSI + CSI-RS) |
| 3 | Discovery burst + PDCCH/PDSCH carrying broadcast information |

In yet another example, an indication of components for DL short control signaling can be a bitmap (or a set of bits), wherein each bit corresponds to one of the components. For instance, a bit taking value of one refers to the corresponding component is included as part of the DL short control signaling, and the bit taking value of zero refers to the corresponding component is not included as part of the DL short control signaling.

In yet another example for an indication of components for DL short control signaling, the absence of the field (e.g., in system information or RRC parameter) refers to no component in DL short control signaling (e.g., do not support DL short control signaling).

In yet another example, there can be an indication on the set of SS/PBCH block(s) included as part of the DL short control signaling. For one sub-example, the indication can be a bitmap (or a set of bits), wherein each bit corresponds to one SS/PBCH block. For another sub-example, the indication can be a number of SS/PBCH blocks.

In one embodiment, there can be a further requirement on the duty cycle of the component(s) included in the DL short control signaling, wherein the duty cycle is defined as the percentage of the time domain occupancy of the DL short control signaling over a predefined time period. For example, regulation requires maximum 10% occupancy over any 100 ms interval.

In one example, the time domain occupancy of the DL short control signaling is defined per cell, which means it is calculated based on the sum of all the components' time domain occupancy.

In one example, the time domain occupancy of the DL short control signaling is defined as the sum of durations for all symbols occupied by the components within the DL short control signaling. In this example, if there is gap(s) in the burst of DL short control signaling, the duration of gap(s) is not counted for the time domain occupancy of the DL short control signaling.

In another example, the time domain occupancy of the DL short control signaling is defined as the sum of durations for all slots including the components within the DL short control signaling. In this example, if there is slot gap(s) in the burst of DL short control signaling, the duration of the slot gap(s) is not counted for the time domain occupancy of the DL short control signaling.

In yet another example, the time domain occupancy of the DL short control signaling is defined as the sum of the time domain occupancy for each burst of the DL short control signaling, wherein the time domain occupancy for each burst is defined as the duration from the starting of the first symbol to the end of the last symbol of the burst, regardless of the potential gap(s) in the burst.

In yet another example, the time domain occupancy of the DL short control signaling is defined as the sum of the time domain occupancy for each burst of the DL short control signaling, wherein the time domain occupancy for each burst is defined as the duration from the starting of the first slot to the end of the last slot that overlap with the burst, regardless of the potential gap(s) in the burst.

In one embodiment, a UL signal and/or channel can be included as part of the short control signaling. The content of UL short control signaling can include at least one of the following example components.

In one example of a first component, a physical random-access channel (PRACH) can be included as part of the short control signaling.

In one example of a second component, a random-access channel (RACH) related signal and channel can be included as part of the short control signaling. For example, msg 1 and/or msg 3 in 4-step RACH, and/or msg A in 2-step RACH.

In one example of a third component, uplink RS can be included as part of the short control signaling. For example, SRS can be included as part of the short control signaling.

In one example of a fourth component, any periodic signal and/or channel can be included as part of the short control signaling.

In one example, at least one component as part of the UL short control signaling needs a pre-condition to include at least one component as part of the DL short control signaling. For example, the support of UL short control signaling needs the support of DL short control signaling as a pre-condition.

In one example, a UE can transmit component(s) in the UL short control signaling without performing channel access procedure, and a gNB can assume the UE transmits component(s) in the UL short control signaling without performing channel access procedure.

In one embodiment, there can be an indication of the components for UL short control signaling.

In one example, there can be a cell-specific indication of the components for UL short control signaling. For example, the cell-specific indication can be in system information, e.g., MIB, or SIB1 (RMSI), or SIBx (OSI). For another example, the cell-specific indication can be in RRC parameter.

For another example, there can be a UE-specific indication of the components for UL short control signaling. For example, the UE-specific indication can be in RRC parameter.

In one example, the indication can include the components for UL short control signaling.

One example indication of components for UL short control signaling is shown in TABLE 3, wherein all the rows or a subset of rows can be supported.

TABLE 3

Example indication of components for DL short control signaling

| Index | Components |
|---|---|
| 0 | No component in UL short control signaling |
| 1 | RACH related signals and channels |
| 2 | UL RS |
| 3 | RACH related signals and channels + UL RS |

In another example, an indication of components for UL short control signaling can be a bitmap (or a set of bits), wherein each bit corresponds to one of the components. For instance, a bit taking value of one refers to the corresponding component is included as part of the UL short control signaling, and the bit taking value of zero refers to the corresponding component is not included as part of the UL short control signaling In yet another example for an indication of components for UL short control signaling, the absence of the field (e.g., in system information or RRC parameter) refers to no component in UL short control signaling (e.g., do not support UL short control signaling).

In another embodiment, there can be an indication of the components for both DL and UL short control signaling (e.g., joint coding of the components for DL and UL short control signaling).

In one example, there can be a cell-specific indication of the components for both DL and UL short control signaling. For example, the cell-specific indication can be in system information, e.g., MIB, or SIB1 (RMSI), or SIBx (OSI). For another example, the cell-specific indication can be in RRC parameter.

In one example, there can be a UE-specific indication of the components for both DL and UL short control signaling. For example, the UE-specific indication can be in RRC parameter.

In one example, the indication can include the components for both DL and UL short control signaling.

In one example, an indication of components for both DL and UL short control signaling is shown in TABLE 4, wherein all the rows or a subset of rows can be supported.

TABLE 4

Example indication of components for DL short control signaling

| Index | Components |
|---|---|
| 0 | No component in DL and UL short control signaling |
| 1 | Only SS/PBCH block |
| 2 | Discovery burst (e.g., SS/PBCH block + PDCCH/PDSCH of RMSI + CSI-RS) |
| 3 | SS/PBCH block + RACH related signal/channel |
| 4 | Discovery burst + RACH related signal/channel |

In one example, an indication of components for both DL and UL short control signaling is shown in TABLE 5, wherein all the rows or a subset of rows can be supported.

TABLE 5

Example indication of components for DL short control signaling

| Index | Components |
|---|---|
| 0 | No component in DL and UL short control signaling |
| 1 | Only SS/PBCH block |
| 2 | Discovery burst (e.g., SS/PBCH block + PDCCH/PDSCH of RMSI + CSI-RS) |
| 3 | SS/PBCH block + RACH related signal/channel |
| 4 | Discovery burst + RACH related signal/channel |
| 5 | PDCCH/PDSCH of RMSI |
| 6 | PDCCH/PDSCH of RMSI + RACH related signal/channel |
| 7 | CSI-RS |
| 8 | CSI-RS + RACH related signal/channel |
| 9 | PDCCH/PDSCH carrying broadcast information |
| 10 | PDCCH/PDSCH carrying broadcast information + RACH related signal/channel |
| 11 | PDCCH/PDSCH carrying broadcast information + CSI-RS |
| 12 | PDCCH/PDSCH carrying broadcast information + CSI-RS + RACH related signal/channel |
| 13 | Discovery burst + PDCCH/PDSCH carrying broadcast information |
| 14 | Discovery burst + PDCCH/PDSCH carrying broadcast information + RACH related signal/channel |

In one example for an indication of components for both DL and UL short control signaling can be a bitmap (or a set of bits), wherein each bit corresponds to one of the components. For instance, a bit taking value of one refers to the corresponding component is included as part of the DL/UL short control signaling, and the bit taking value of zero refers to the corresponding component is not included as part of the DL/UL short control signaling.

In yet another example for an indication of components for both DL and UL short control signaling, the absence of the field (e.g., in system information or RRC parameter) refers to no component in DL and UL short control signaling (e.g., do not support DL and UL short control signaling).

In one embodiment, there can be a further requirement on the duty cycle of the component(s) included in the UL short control signaling, wherein the duty cycle is defined as the percentage of the time domain occupancy of the UL short control signaling over a predefined time period. For example, regulation requires maximum 10% occupancy over any 100 ms interval.

In one example, the time domain occupancy of the UL short control signaling is defined for each UE and calculated as the sum of durations for all symbols occupied by the components within the UL short control signaling. In this example, if there is gap(s) in the burst of UL short control signaling, the duration of gap(s) is not counted for the time domain occupancy of the UL short control signaling.

In another example, the time domain occupancy of the UL short control signaling is defined for each UE and calculated as the sum of durations for all slots including the components within the UL short control signaling. In this example, if there is slot gap(s) in the burst of UL short control signaling, the duration of the slot gap(s) is not counted for the time domain occupancy of the UL short control signaling.

In yet another example, the time domain occupancy of the UL short control signaling is defined for each UE, and calculated as the sum of the time domain occupancy for each burst of the UL short control signaling, wherein the time domain occupancy for each burst is defined as the duration from the starting of the first symbol to the end of the last symbol of the burst, regardless of the potential gap(s) in the burst.

In yet another example, the time domain occupancy of the UL short control signaling is defined for each UE, and calculated as the sum of the time domain occupancy for each burst of the UL short control signaling, wherein the time domain occupancy for each burst is defined as the duration from the starting of the first slot to the end of the last slot that overlap with the burst, regardless of the potential gap(s) in the burst.

In one example, the time domain occupancy of the UL short control signaling is defined for each UE and calculated as the sum of durations for all symbols configured for transmitting the components within the UL short control signaling. In this example, if there is gap(s) in the configuration of components for UL short control signaling, the duration of gap(s) is not counted for the time domain occupancy of the UL short control signaling. For instance, if RACH related signal/channel is part of the UL short control signaling, the configured time domain resources for transmitting the RACH related signal/channel are all counted for calculating the time domain occupancy of the UL short control signaling.

In another example, the time domain occupancy of the UL short control signaling is defined for each UE and calculated as the sum of all configured slots for transmitting the components within the UL short control signaling. In this example, if there is slot gap(s) in the configuration of components for UL short control signaling, the duration of the slot gap(s) is not counted for the time domain occupancy of the UL short control signaling. For instance, if RACH related signal/channel is part of the UL short control signaling, the configured time domain resources (e.g., slots) for transmitting the RACH related signal/channel are all counted for calculating the time domain occupancy of the UL short control signaling.

In one example, the time domain occupancy of the UL short control signaling is defined for each cell and calculated as the sum of durations for all symbols configured for transmitting the components within the UL short control signaling. In this example, if there is gap(s) in the configuration of components within UL short control signaling, the duration of gap(s) is not counted for the time domain occupancy of the UL short control signaling. For instance, if RACH related signal/channel is part of the UL short control signaling, the configured time domain resources (e.g., symbols) for transmitting the RACH related signal/channel for all the UEs are all counted for calculating the time domain occupancy of the UL short control signaling.

In another example, the time domain occupancy of the UL short control signaling is defined for each cell and calculated as the sum of durations for all slots configured for transmitting the components within the UL short control signaling. In this example, if there is slot gap(s) in the configuration of components within UL short control signaling, the duration of slot gap(s) is not counted for the time domain occupancy of the UL short control signaling. For instance, if RACH related signal/channel is part of the UL short control signaling, the configured time domain resources (e.g., slots) for transmitting the RACH related signal/channel for all the UEs are all counted for calculating the time domain occupancy of the UL short control signaling.

In another embodiment, there can be a further requirement on the duty cycle of the component(s) included in both the DL and UL short control signaling, wherein the duty cycle is defined as the percentage of the time domain occupancy of the DL and UL short control signaling over a predefined time period. For example, regulation requires maximum 10% occupancy over any 100 ms interval.

In one example, the time domain occupancy of the DL and UL short control signaling is defined for each cell and calculated as the sum of durations of all symbols for transmitting the components within the DL and UL short control signaling. In this example, if there is gap(s) in the configuration of components within DL and UL short control signaling, the duration of gap(s) is not counted for the time domain occupancy of the DL and UL short control signaling. For instance, if RACH related signal/channel is part of the DL and UL short control signaling, the configured time domain resources (e.g., symbols) for transmitting the RACH related signal/channel for all the UEs are all counted for calculating the time domain occupancy of the DL and UL short control signaling.

In another example, the time domain occupancy of the DL and UL short control signaling is defined for each cell and calculated as the sum of durations of all slots for transmitting the components within the DL and UL short control signaling. In this example, if there is slot gap(s) in the configuration of components within DL and UL short control signaling, the duration of slot gap(s) is not counted for the time domain occupancy of the DL and UL short control signaling. For instance, if RACH related signal/channel is part of the DL and UL short control signaling, the configured time domain resources (e.g., slots) for transmitting the RACH related signal/channel for all the UEs are all counted for calculating the time domain occupancy of the DL and UL short control signaling.

Figure 6:
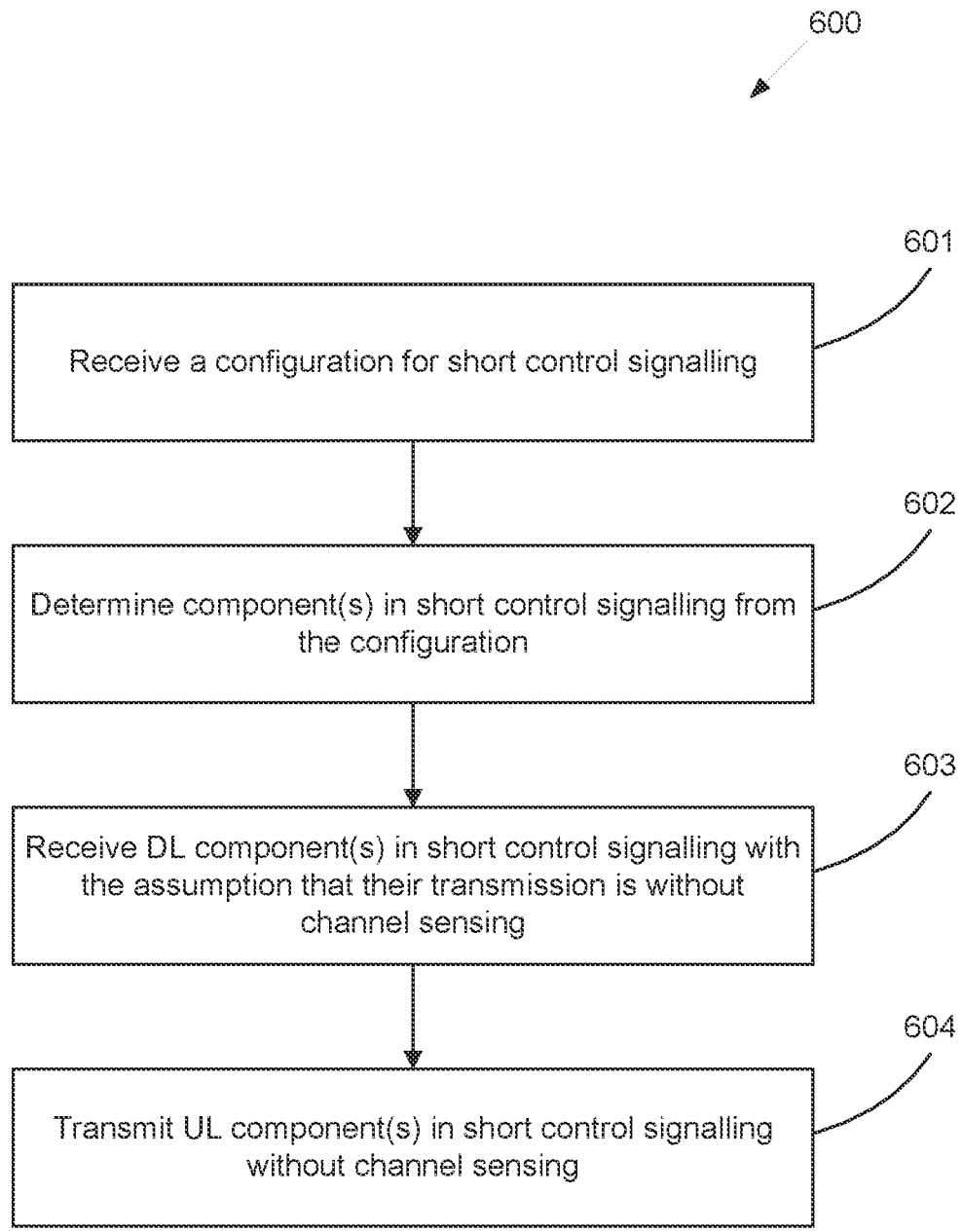
FIG. 6 illustrates a flowchart of UE method for a short control signaling according to embodiments of the present disclosure.

FIG. 6 illustrates a flowchart of UE method 600 for a short control signaling according to embodiments of the present disclosure. The UE method 600 as may be performed by a UE (e.g., 111-116 as illustrated in FIG. 1) and an analogous procedure may be performed by a BS such as BS 102 in FIG. 1. An embodiment of the UE method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

In one embodiment, an example of UE procedure for supporting short control signaling is shown in FIG. 6. A UE receives a configuration for short control signaling from a DL channel (601) and determines the components in short control signaling from the configuration (602). If there is DL component(s) in the short control signaling, the UE further receives the DL component(s) in the short control signaling, with an assumption that their transmission is not initialized by a channel sensing procedure (603). If there is UL component(s) in the short control signaling, the UE further transmits the UL component(s) in the short control signaling over an UL channel, without performing a channel sensing procedure (604).

For NR, when supporting 60 GHz unlicensed spectrum, the same principle could be applicable, in order to prioritize the transmission of such signals and/or channels. However, there are design details to be considered for a centralized system like NR, e.g., how to define the content of short control signaling, and how to indicate to the UE.

The present disclosure provides an indication of channel access procedure in a DCI format, wherein the indication includes at least a channel access procedure type. More precisely, the present disclosure includes the following components: (1) channel access procedure types: type 1 channel access procedure and type 2 channel access procedure; (2) an indication of channel access procedure type in DCI: indication examples and example DCI format; and (3) a UE procedure for an indication of channel access procedure.

In one embodiment, there can be at least one type of channel access procedure supported for an unlicensed spectrum.

In Type 1 channel access procedure, the time duration spanned by the sensing slots that are sensed to be idle before a transmission is random. For example, the time duration is counted towards a random counter, wherein the counter N is generated according to an upper bound (e.g., contention window CW).

In one example, the random counter can be adjusted according to the following steps in Type 1 channel access procedure: (1) generate the random counter N uniformly distributed between 0 and CW (or $CW_p$ if more than one priority class are supported, wherein p is the priority class); (2) if N>0, and the transmitter chooses to decrement the counter, set N=N−1; (3) sense the channel for an additional sensing slot duration, and if the additional sensing slot duration is sensed as idle, go to step 4); else, go to step 5); (4) if N=0, stop; else, go to step 2); (5) sense the channel until a busy sensing slot is detected within an additional defer duration or all the sensing slots of the additional defer duration are detected to be idle; and (6) if the channel is sensed to be idle during all the sensing slot durations of the additional defer duration, go to step 4); else, go to step 5).

In one example of the Type 1 channel access procedure, there can be at least one priority class supported, wherein each of the priority class can be associated with a different value of the upper bound (e.g., contention window size CW) on generating the random counter N.

For one example, when one single priority class is supported for the Type 1 channel access procedure (equivalent to no distinguishing of priority class), the example value of the upper bound (e.g., contention window size CW or $CW_1$) on generating the random counter N can be according to TABLE 6.

TABLE 6

Example value of contention window for Type 1 channel access procedure

| Priority class for Type 1 channel access procedure (p) | $CW_p$ |
|---|---|
| 1 | 3 |

For another example, when two priority classes are supported for the Type 1 channel access procedure, the example value of the upper bound (e.g., contention window size $CW_p$) on generating the random counter N can be according to TABLE 7.

TABLE 7

Example value of contention window for Type 1 channel access procedure

| Priority class for Type 1 channel access procedure (p) | $CW_p$ |
|---|---|
| 1 | 3 |
| 2 | 7 |

For yet another example, when three priority classes are supported for the Type 1 channel access procedure, the example value of the upper bound (e.g., contention window size $CW_p$) on generating the random counter N can be according to TABLE 8.

TABLE 8

Example value of contention window for Type 1 channel access procedure

| Priority class for Type 1 channel access procedure (p) | $CW_p$ |
|---|---|
| 1 | 3 |
| 2 | 7 |
| 3 | 15 |

For yet another example, when four priority classes are supported for the Type 1 channel access procedure, the example value of the upper bound (e.g., contention window size $CW_p$) on generating the random counter N can be according to TABLE 9.

TABLE 9

Example value of contention window for Type 1 channel access procedure

| Priority class for Type 1 channel access procedure (p) | $CW_p$ |
|---|---|
| 1 | 3 |
| 2 | 7 |
| 3 | 15 |
| 4 | 63 |

In Type 2 channel access procedure, the time duration spanned by the sensing slots that are sensed to be idle before a transmission is fixed. For one example, the fixed time duration can be zero. For another example, the fixed time duration can be positive.

In one embodiment, there is an indication including at least a channel access procedure type in a DCI format.

In one example, there are only two types of channel access procedures supported, e.g., Type 1 channel access procedure with a fixed upper bound (e.g., CW) to generate the counter (e.g., equivalent as a single priority class), and Type 2 channel access procedure with a zero-sensing time duration. There can be a bit field in the DCI format to indicate the channel access procedure type as defined in TABLE 10. In one further consideration, this bit field shows up in the DCI format with 1 bit if the operation is with shared spectrum channel access and/or channel sensing is required to initialize a channel occupancy (e.g., listen before talk (LBT) mode enabled), and the bit field does not show up (e.g., 0 bit) otherwise.

TABLE 10

Example channel access procedure type indication

| Bit field mapped to index | Channel access procedure type |
|---|---|
| 0 | Type 1 channel access procedure |
| 1 | Type 2 channel access procedure |

In one example of the DCI format, the DCI format can be the DCI format 0_0 with cyclic redundancy check (CRC) scrambled by a cell radio-network temporary identifier (C-RNTI) or a configured scheduling-RNTI (CS-RNTI) or a modulation and coding scheme-cell radio-RNTI (MCS-C-RNTI).

In another example of the DCI format, the DCI format can be the DCI format 0_0 with CRC scrambled by a temporary cell-RNTI (TC-RNTI).

In yet another example of the DCI format, the DCI format can be the DCI format 0_1 with CRC scrambled by C-RNTI or CS-RNTI or semi-persistent-CSI-RNTI (SP-CSI-RNTI) or MCS-C-RNTI.

In yet another example of the DCI format, the DCI format can be the DCI format 1_0 with CRC scrambled by C-RNTI and for random access procedure not initialized by a PDCCH order.

In yet another example of the DCI format, the DCI format can be the DCI format 1_0 with CRC scrambled by TC-RNTI.

In yet another example of the DCI format, the DCI format 1_1 with CRC scrambled by C-RNTI or CS-RNTI or MCS-C-RNTI.

In one example, there are only two types of channel access procedures supported, e.g., Type 1 channel access procedure with an upper bound (e.g., CW) to generate the counter, and Type 2 channel access procedure with a zero sensing time duration, wherein the Type 1 channel access procedure can be further associated with two priority classes and each corresponds to a value of the upper bound to generate the counter (e.g., $CW_1$ and $CW_2$).

In one instance, there can be a bit field in the DCI format to indicate the channel access procedure type as defined in TABLE 11. In one further consideration, this bit field shows up in the DCI format with 2 bits if the operation is with shared spectrum channel access and/or channel sensing is required to initialize a channel occupancy (e.g., LBT mode enabled), and the bit field does not show up (e.g., 0 bit) otherwise.

In another instance, there can be a bit field in the DCI format to indicate the channel access procedure type with one or more entries in TABLE 11 configured by a RRC parameter. In one further consideration, this bit field shows up in the DCI format with $\lceil \log_2(I) \rceil$ bit if the operation is with shared spectrum channel access and/or channel sensing is required to initialize a channel occupancy (e.g., LBT mode enabled), and the bit field does not show up (e.g., 0 bit) otherwise, wherein I is the number of configured entries from TABLE 11.

TABLE 11

Example channel access procedure type indication

| Bit field mapped to index | Channel access procedure type |
|---|---|
| 0 | Type 1 channel access procedure with $CW_1$ |
| 1 | Type 1 channel access procedure with $CW_2$ |
| 2 | Type 2 channel access procedure |

In one example of the DCI format, the DCI format can be the DCI format 0_0 with CRC scrambled by C-RNTI or CS-RNTI or MCS-C-RNTI.

In another example of the DCI format, the DCI format can be the DCI format 0_0 with CRC scrambled by TC-RNTI.

In yet another example of the DCI format, the DCI format can be the DCI format 0_1 with CRC scrambled by C-RNTI or CS-RNTI or SP-CSI-RNTI or MCS-C-RNTI.

In yet another example of the DCI format, the DCI format can be the DCI format 1_0 with CRC scrambled by C-RNTI and for random access procedure not initialized by a PDCCH order.

In yet another example of the DCI format, the DCI format can be the DCI format 1_0 with CRC scrambled by TC-RNTI.

In yet another example of the DCI format, the DCI format 1_1 with CRC scrambled by C-RNTI or CS-RNTI or MCS-C-RNTI.

In one example, there are only two types of channel access procedures supported, e.g., Type 1 channel access procedure with an upper bound (e.g., CW) to generate the counter, and Type 2 channel access procedure with a zero sensing time duration, wherein the Type 1 channel access procedure can be further associated with three priority classes and each corresponds to a value of the upper bound to generate the counter (e.g., $CW_1$, $CW_2$, and $CW_3$).

In one instance, there can be a bit field in the DCI format to indicate the channel access procedure type as defined in TABLE 12. In one further consideration, this bit field shows up in the DCI format with 2 bits if the operation is with shared spectrum channel access and/or channel sensing is required to initialize a channel occupancy (e.g., LBT mode enabled), and the bit field does not show up (e.g., 0 bit) otherwise.

In another instance, there can be a bit field in the DCI format to indicate the channel access procedure type with one or more entries in TABLE 12 configured by a RRC parameter. In one further consideration, this bit field shows up in the DCI format with $\lceil \log_2(I) \rceil$ bit if the operation is with shared spectrum channel access and/or channel sensing is required to initialize a channel occupancy (e.g., LBT mode enabled), and the bit field does not show up (e.g., 0 bit) otherwise, wherein I is the number of configured entries from TABLE 12.

TABLE 12

Example channel access procedure type indication

| Bit field mapped to index | Channel access procedure type |
|---|---|
| 0 | Type 1 channel access procedure with $CW_1$ |
| 1 | Type 1 channel access procedure with $CW_2$ |
| 2 | Type 1 channel access procedure with $CW_3$ |
| 3 | Type 2 channel access procedure |

In one example of the DCI format, the DCI format can be the DCI format 0_0 with CRC scrambled by C-RNTI or CS-RNTI or MCS-C-RNTI.

In another example of the DCI format, the DCI format can be the DCI format 0_0 with CRC scrambled by TC-RNTI.

In yet another example of the DCI format, the DCI format can be the DCI format 0_1 with CRC scrambled by C-RNTI or CS-RNTI or SP-CSI-RNTI or MCS-C-RNTI.

In yet another example of the DCI format, the DCI format can be the DCI format 1_0 with CRC scrambled by C-RNTI and for random access procedure not initialized by a PDCCH order.

In yet another example of the DCI format, the DCI format can be the DCI format 1_0 with CRC scrambled by TC-RNTI.

In yet another example of the DCI format, the DCI format 1_1 with CRC scrambled by C-RNTI or CS-RNTI or MCS-C-RNTI.

In yet another example, there are only two types of channel access procedures supported, e.g., Type 1 channel access procedure with an upper bound (e.g., CW) to generate the counter, and Type 2 channel access procedure with a zero sensing time duration, wherein the Type 1 channel access procedure can be further associated with four priority classes and each corresponds to a value of the upper bound to generate the counter (e.g., $CW_1$, $CW_2$, $CW_3$, and $CW_4$).

In one instance, there can be a bit field in the DCI format to indicate the channel access procedure type as defined in TABLE 13. In one further consideration, this bit field shows up in the DCI format with 3 bits if the operation is with shared spectrum channel access and/or channel sensing is required to initialize a channel occupancy (e.g., LBT mode enabled), and the bit field does not show up (e.g., 0 bit) otherwise.

In another instance, there can be a bit field in the DCI format to indicate the channel access procedure type with one or more entries in TABLE 13 configured by a RRC parameter. In one further consideration, this bit field shows up in the DCI format with $\lceil \log_2(I) \rceil$ bit if the operation is with shared spectrum channel access and/or channel sensing is required to initialize a channel occupancy (e.g., LBT mode enabled), and the bit field does not show up (e.g., 0 bit) otherwise, wherein I is the number of configured entries from TABLE 13.

TABLE 13

Example channel access procedure type indication

| Bit field mapped to index | Channel access procedure type |
|---|---|
| 0 | Type 1 channel access procedure with $CW_1$ |
| 1 | Type 1 channel access procedure with $CW_2$ |
| 2 | Type 1 channel access procedure with $CW_3$ |
| 3 | Type 1 channel access procedure with $CW_4$ |
| 4 | Type 2 channel access procedure |

In one example of the DCI format, the DCI format can be the DCI format 0_0 with CRC scrambled by C-RNTI or CS-RNTI or MCS-C-RNTI.

In another example of the DCI format, the DCI format can be the DCI format 0_0 with CRC scrambled by TC-RNTI.

In yet another example of the DCI format, the DCI format can be the DCI format 0_1 with CRC scrambled by C-RNTI or CS-RNTI or SP-CSI-RNTI or MCS-C-RNTI.

In yet another example of the DCI format, the DCI format can be the DCI format 1_0 with CRC scrambled by C-RNTI and for random access procedure not initialized by a PDCCH order.

In yet another example of the DCI format, the DCI format can be the DCI format 1_0 with CRC scrambled by TC-RNTI.

In yet another example of the DCI format, the DCI format 1_1 with CRC scrambled by C-RNTI or CS-RNTI or MCS-C-RNTI.

In yet another example, there are only two types of channel access procedures supported, e.g., Type 1 channel access procedure with a fixed upper bound (e.g., CW) to generate the counter (e.g., equivalent as a single priority class), and Type 2 channel access procedure with a fixed sensing time duration, wherein the Type 2 channel access procedure can be further classified into two sub-types: Type 2A channel access procedure with a positive and fixed sensing time duration, and Type 2B channel access procedure with a zero sensing time duration.

In one instance, there can be a bit field in the DCI format to indicate the channel access procedure type as defined in TABLE 14. In one further consideration, this bit field shows up in the DCI format with 2 bits, e.g. if the operation is with shared spectrum channel access and/or channel sensing is required to initialize a channel occupancy (e.g., LBT mode enabled), and the bit field does not show up (e.g., 0 bit) otherwise. In another further consideration, the DCI format for this instance can be according to a first set of examples described in the disclosure (e.g. DCI format 0_0 and/or 1_0).

In another instance, there can be a bit field in the DCI format to indicate the channel access procedure type with one or more entries in TABLE 14 configured by a RRC parameter. In one further consideration, this bit field shows up in the DCI format with $\lceil \log_2(I) \rceil$ bit, e.g. if the operation is with shared spectrum channel access and/or channel sensing is required to initialize a channel occupancy (e.g., LBT mode enabled), and the bit field does not show up (e.g., 0 bit) otherwise, wherein I is the number of configured entries from TABLE 14. In another further consideration, the DCI format for this instance can be according to a second set of examples described in the disclosure (e.g. DCI format 0_1 and/or 1_1).

TABLE 14

Example channel access procedure type indication

| Bit field mapped to index | Channel access procedure type |
|---|---|
| 0 | Type 1 channel access procedure |
| 1 | Type 2A channel access procedure |
| 2 | Type 2B channel access procedure |

In one example of the DCI format, the DCI format can be the DCI format 0_0 with CRC scrambled by C-RNTI or CS-RNTI or MCS-C-RNTI.

In another example of the DCI format, the DCI format can be the DCI format 0_0 with CRC scrambled by TC-RNTI.

In yet another example of the DCI format, the DCI format can be the DCI format 0_1 with CRC scrambled by C-RNTI or CS-RNTI or SP-CSI-RNTI or MCS-C-RNTI.

In yet another example of the DCI format, the DCI format can be the DCI format 1_0 with CRC scrambled by C-RNTI and for random access procedure not initialized by a PDCCH order.

In yet another example of the DCI format, the DCI format can be the DCI format 1_0 with CRC scrambled by TC-RNTI.

In yet another example of the DCI format, the DCI format 1_1 with CRC scrambled by C-RNTI or CS-RNTI or MCS-C-RNTI.

In yet another example, there are only two types of channel access procedures supported, e.g., Type 1 channel access procedure with an upper bound (e.g., CW) to generate the counter, and Type 2 channel access procedure with a positive sensing time duration, wherein the Type 1 channel access procedure can be further associated with two priority classes and each corresponds to a value of the upper bound to generate the counter (e.g., $CW_1$ and $CW_2$), and the Type 2 channel access procedure can be further classified into two sub-types: Type 2A channel access procedure with a positive and fixed sensing time duration, and Type 2B channel access procedure with a zero sensing time duration.

In one instance, there can be a bit field in the DCI format to indicate the channel access procedure type as defined in TABLE 15. In one further consideration, this bit field shows up in the DCI format with 2 bits if the operation is with shared spectrum channel access and/or channel sensing is required to initialize a channel occupancy (e.g., LBT mode enabled), and the bit field does not show up (e.g., 0 bit) otherwise.

In another instance, there can be a bit field in the DCI format to indicate the channel access procedure type with one or more entries in TABLE 15 configured by a RRC parameter. In one further consideration, this bit field shows up in the DCI format with $\lceil \log_2(I) \rceil$ bit if the operation is with shared spectrum channel access and/or channel sensing is required to initialize a channel occupancy (e.g., LBT mode enabled), and the bit field does not show up (e.g., 0 bit) otherwise, wherein I is the number of configured entries from TABLE 15.

TABLE 15

Example channel access procedure type indication

| Bit field mapped to index | Channel access procedure type |
|---|---|
| 0 | Type 1 channel access procedure with $CW_1$ |
| 1 | Type 1 channel access procedure with $CW_2$ |
| 2 | Type 2A channel access procedure |
| 3 | Type 2B channel access procedure |

In one example of the DCI format, the DCI format can be the DCI format 0_0 with CRC scrambled by C-RNTI or CS-RNTI or MCS-C-RNTI.

In another example of the DCI format, the DCI format can be the DCI format 0_0 with CRC scrambled by TC-RNTI.

In yet another example of the DCI format, the DCI format can be the DCI format 0_1 with CRC scrambled by C-RNTI or CS-RNTI or SP-CSI-RNTI or MCS-C-RNTI.

In yet another example of the DCI format, the DCI format can be the DCI format 1_0 with CRC scrambled by C-RNTI and for random access procedure not initialized by a PDCCH order.

In yet another example of the DCI format, the DCI format can be the DCI format 1_0 with CRC scrambled by TC-RNTI.

In yet another example of the DCI format, the DCI format 1_1 with CRC scrambled by C-RNTI or CS-RNTI or MCS-C-RNTI.

In yet another example, there are only two types of channel access procedures supported, e.g., Type 1 channel access procedure with an upper bound (e.g., CW) to generate the counter, and Type 2 channel access procedure with a positive sensing time duration, wherein the Type 1 channel access procedure can be further associated with three priority classes and each corresponds to a value of the upper bound to generate the counter (e.g., $CW_1$, $CW_2$ and $CW_3$), and the Type 2 channel access procedure can be further classified into two sub-types: Type 2A channel access procedure with a positive and fixed sensing time duration, and Type 2B channel access procedure with a zero sensing time duration.

In one instance, there can be a bit field in the DCI format to indicate the channel access procedure type as defined in TABLE 16. In one further consideration, this bit field shows up in the DCI format with 3 bits if the operation is with shared spectrum channel access and/or channel sensing is required to initialize a channel occupancy (e.g., LBT mode enabled), and the bit field does not show up (e.g., 0 bit) otherwise.

In another instance, there can be a bit field in the DCI format to indicate the channel access procedure type with one or more entries in TABLE 16 configured by a RRC parameter. In one further consideration, this bit field shows up in the DCI format with $\lceil \log_2(I) \rceil$ bit if the operation is with shared spectrum channel access and/or channel sensing is required to initialize a channel occupancy (e.g., LBT mode enabled), and the bit field does not show up (e.g., 0 bit) otherwise, wherein I is the number of configured entries from TABLE 16.

TABLE 16

Example channel access procedure type indication

| Bit field mapped to index | Channel access procedure type |
| --- | --- |
| 0 | Type 1 channel access procedure with $CW_1$ |
| 1 | Type 1 channel access procedure with $CW_2$ |
| 2 | Type 1 channel access procedure with $CW_3$ |
| 3 | Type 2A channel access procedure |
| 4 | Type 2B channel access procedure |

In one example of the DCI format, the DCI format can be the DCI format 0_0 with CRC scrambled by C-RNTI or CS-RNTI or MCS-C-RNTI.

In another example of the DCI format, the DCI format can be the DCI format 0_0 with CRC scrambled by TC-RNTI.

In yet another example of the DCI format, the DCI format can be the DCI format 0_1 with CRC scrambled by C-RNTI or CS-RNTI or SP-CSI-RNTI or MCS-C-RNTI.

In yet another example of the DCI format, the DCI format can be the DCI format 1_0 with CRC scrambled by C-RNTI and for random access procedure not initialized by a PDCCH order.

In yet another example of the DCI format, the DCI format can be the DCI format 1_0 with CRC scrambled by TC-RNTI.

In yet another example of the DCI format, the DCI format 1_1 with CRC scrambled by C-RNTI or CS-RNTI or MCS-C-RNTI.

In yet another example, there are only two types of channel access procedures supported, e.g., Type 1 channel access procedure with an upper bound (e.g., CW) to generate the counter, and Type 2 channel access procedure with a positive sensing time duration, wherein the Type 1 channel access procedure can be further associated with three priority classes and each corresponds to a value of the upper bound to generate the counter (e.g., $CW_1$, $CW_2$ $CW_3$, and $CW_4$), and the Type 2 channel access procedure can be further classified into two sub-types: Type 2A channel access procedure with a positive and fixed sensing time duration, and Type 2B channel access procedure with a zero sensing time duration.

In one instance, there can be a bit field in the DCI format to indicate the channel access procedure type as defined in TABLE 17. In one further consideration, this bit field shows up in the DCI format with 3 bits if the operation is with shared spectrum channel access and/or channel sensing is required to initialize a channel occupancy (e.g., LBT mode enabled), and the bit field does not show up (e.g., 0 bit) otherwise.

In another instance, there can be a bit field in the DCI format to indicate the channel access procedure type with one or more entries in TABLE 17 configured by a RRC parameter. In one further consideration, this bit field shows up in the DCI format with $\lceil \log_2(I) \rceil$ bit if the operation is with shared spectrum channel access and/or channel sensing is required to initialize a channel occupancy (e.g., LBT mode enabled), and the bit field does not show up (e.g., 0 bit) otherwise, wherein I is the number of configured entries from TABLE 17.

TABLE 17

Example channel access procedure type indication

| Bit field mapped to index | Channel access procedure type |
| --- | --- |
| 0 | Type 1 channel access procedure with $CW_1$ |
| 1 | Type 1 channel access procedure with $CW_2$ |
| 2 | Type 1 channel access procedure with $CW_3$ |
| 3 | Type 1 channel access procedure with $CW_4$ |
| 4 | Type 2A channel access procedure |
| 5 | Type 2B channel access procedure |

In one example of the DCI format, the DCI format can be the DCI format 0_0 with CRC scrambled by C-RNTI or CS-RNTI or MCS-C-RNTI.

In another example of the DCI format, the DCI format can be the DCI format 0_0 with CRC scrambled by TC-RNTI.

In yet another example of the DCI format, the DCI format can be the DCI format 0_1 with CRC scrambled by C-RNTI or CS-RNTI or SP-CSI-RNTI or MCS-C-RNTI.

In yet another example of the DCI format, the DCI format can be the DCI format 1_0 with CRC scrambled by C-RNTI and for random access procedure not initialized by a PDCCH order.

In yet another example of the DCI format, the DCI format can be the DCI format 1_0 with CRC scrambled by TC-RNTI.

In yet another example of the DCI format, the DCI format 1_1 with CRC scrambled by C-RNTI or CS-RNTI or MCS-C-RNTI.

Figure 7:
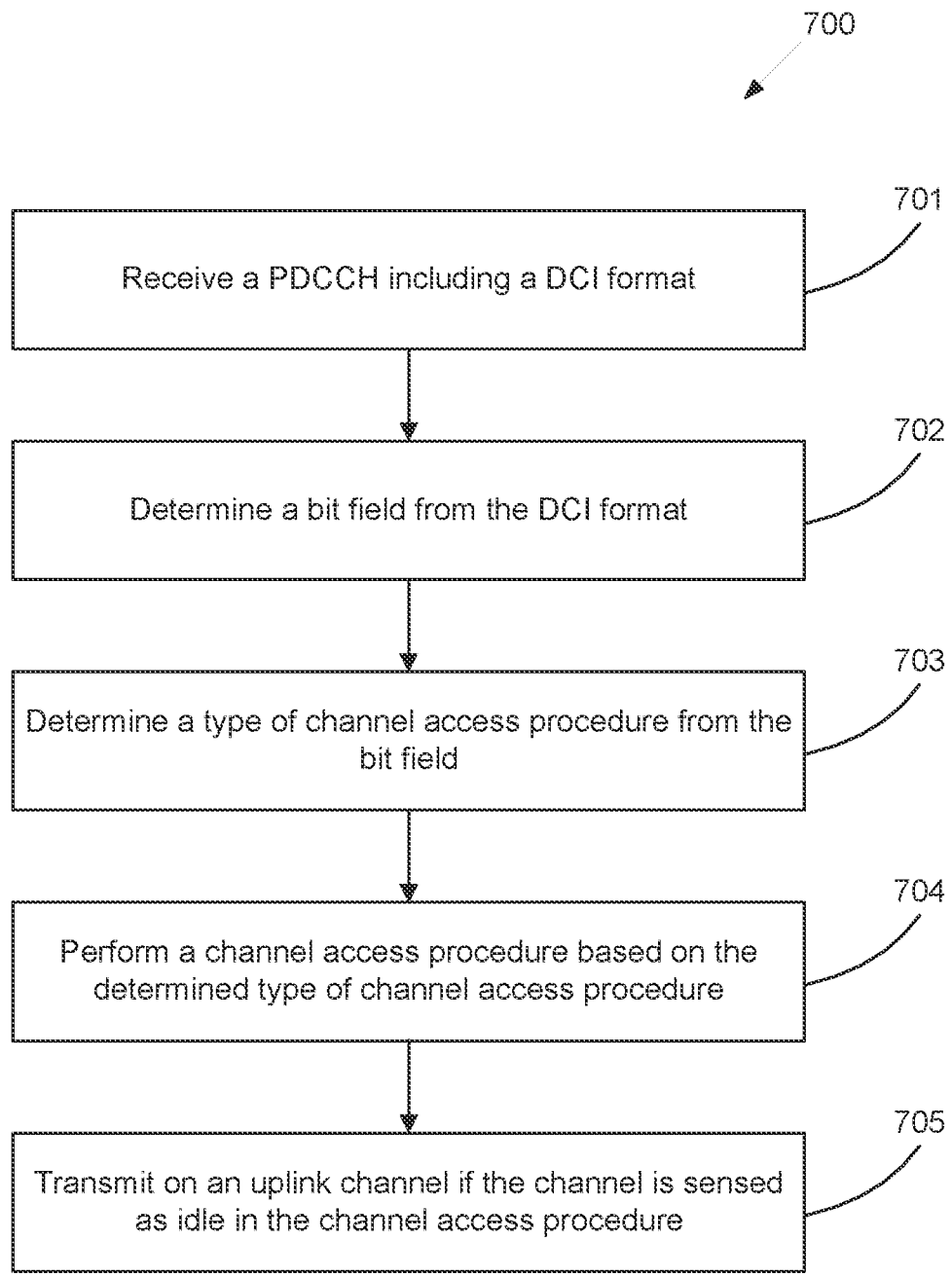
FIG. 7 illustrates a flowchart of UE method for a channel access procedure according to embodiments of the present disclosure.

FIG. 7 illustrates a flowchart of UE method 700 for a channel access procedure according to embodiments of the present disclosure. The UE method 700 as may be performed by a UE (e.g., 111-116 as illustrated in FIG. 1) and an analogous procedure may be performed by a BS such as BS 102 in FIG. 1. An embodiment of the UE method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

In one embodiment, an example UE procedure for channel access procedure indication is shown in FIG. 7. A UE receives a PDCCH from a gNB, wherein the PDCCH includes a DCI format (701). The UE determines a bit field from the DCI format (702), and further determines a type of channel access procedure from the bit field (703). The UE performs a channel access procedure based on the determined type of channel access procedure (704), and then transmits based on the determined type of channel access procedure (705).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:
   a processor configured to determine a field in a downlink control information (DCI) format, wherein the field includes information on a type of channel access procedure and wherein the type of channel access procedure is one of:
      a first type of channel access procedure that includes a random time duration for sensing;
      a second type of channel access procedure that includes a positive and deterministic time duration for sensing; or
      a third type of channel access procedure that does not include a time duration for sensing; and
   a transceiver operably coupled to the processor, the transceiver configured to:
      transmit, to a user equipment (UE), the DCI format over a channel with shared spectrum channel access; and
      receive, from the UE, an uplink transmission on the channel with shared spectrum channel access after a channel access procedure performed based on the type of channel access procedure indicated in the DCI format.

2. The BS of claim 1, wherein:
   the random time duration for sensing in the first type of channel access procedure is given by a number N of sensing slots, and
   N is generated based on a uniform distribution between 0 and a fixed contention window CW=3.

3. The BS of claim 1, wherein the DCI format is at least one of:
   a DCI format 0_0 with a cyclic redundancy check (CRC) scrambled by: a cell radio network temporary identifier (C-RNTI), a configured scheduling radio network temporary identifier (CS-RNTI), a modulation coding scheme cell radio network temporary identifier (MCS-C-RNTI), or a temporary cell radio network temporary identifier (TC-RNTI); or
   a DCI format 0_1 with a CRC scrambled by: a C-RNTI, a CS-RNTI, a semi-persistent channel state information radio network temporary identifier (SP-CSI-RNTI), or a MCS-C-RNTI.

4. The BS of claim 1, wherein:
   the processor is further configured to determine a number of bits for the field based on the DCI format:
   when the DCI format is a DCI format 0_0, the number of bits for the field is fixed as 2; and
   when the DCI format is a DCI format 0_1, the number of bits for the field is determined as $\lceil \log_2(I) \rceil$, wherein I is a number of channel access types configured by a higher layer parameter.

5. The BS of claim 1, wherein:
   the transceiver is further configured to transmit a higher layer parameter to the UE, and
   the higher layer parameter includes information on whether a set of uplink transmissions is exempt from performing a channel access procedure.

6. The BS of claim 5, wherein the set of uplink transmissions includes a message 1 (msg1) transmission in a 4-step random access procedure or a message A (msgA) transmission in a 2-step random access procedure.

7. The BS of claim 5, wherein the transceiver is further configured to receive the set of uplink transmissions.

8. A user equipment (UE) in a wireless communication system, the UE comprising:
   a transceiver configured to receive, from a base station (BS), a downlink control information (DCI) format; and
   a processor operably coupled to the transceiver, the processor configured to:
      determine a type of channel access procedure based on a field in the DCI format, wherein the type of channel access procedure is one of:
         a first type of channel access procedure that includes a random time duration for sensing;
         a second type of channel access procedure that includes a positive and deterministic time duration for sensing; or
         a third type of channel access procedure that does not include a time duration for sensing; and
      perform a channel access procedure based on the determined type of channel access procedure,
   wherein the transceiver further configured to transmit an uplink transmission on a channel with shared spectrum channel access after performing the channel access procedure.

9. The UE of claim 8, wherein:
   the random time duration for sensing in the first type of channel access procedure is given by a number N of sensing slots, and
   N is generated based on a uniform distribution between 0 and a fixed contention window CW=3.

10. The UE of claim 8, wherein the DCI format is at least one of:
    a DCI format 0_0 with a cyclic redundancy check (CRC) scrambled by: a cell radio network temporary identifier (C-RNTI), a configured scheduling radio network temporary identifier (CS-RNTI), a modulation coding scheme cell radio network temporary identifier (MCS-C-RNTI), or a temporary cell radio network temporary identifier (TC-RNTI); or
    a DCI format 0_1 with a CRC scrambled by a C-RNTI, a CS-RNTI, a semi-persistent channel state information radio network temporary identifier (SP-CSI-RNTI), or a MCS-C-RNTI.

11. The UE of claim 8, wherein:
    the processor is further configured to determine a number of bits for the field based on the DCI format:
    when the DCI format is a DCI format 0_0, the number of bits for the field is fixed as 2; and
    when the DCI format is a DCI format 0_1, the number of bits for the field is determined as $\lceil \log_2(I) \rceil$, wherein I is a number of channel access types configured by a higher layer parameter.

12. The UE of claim 8, wherein:
    the transceiver is further configured to receive a higher layer parameter from the BS, and the higher layer parameter includes information on whether a set of uplink transmissions is exempt from performing a channel access procedure.

13. The UE of claim 12, wherein the set of uplink transmissions includes a message 1 (msg1) transmission in a 4-step random access procedure or a message A (msgA) transmission in a 2-step random access procedure.

14. The UE of claim 12, wherein:
the processor is configured to determine a duty cycle for the set of uplink transmissions; and
the transceiver is further configured to transmit the set of uplink transmissions without performing channel access procedure on the channel with shared spectrum channel access based on a determination that the duty cycle for the set of uplink transmissions does not exceed a threshold.

15. A method of a user equipment (UE) in a wireless communication system, the method comprising:
receiving, from a base station (BS), a downlink control information (DCI) format;
determining a type of channel access procedure based on a field in the DCI format, wherein the type of channel access procedure is one of:
 a first type of channel access procedure that includes a random time duration for sensing;
 a second type of channel access procedure that includes a positive and deterministic time duration for sensing; or
 a third type of channel access procedure that does not include a time duration for sensing;
performing a channel access procedure based on the determined type of channel access procedure; and
transmitting an uplink transmission on a channel with shared spectrum channel access after performing the channel access procedure.

16. The method of claim 15, wherein:
the random time duration for sensing in the first type of channel access procedure is given by a number N of sensing slots, and
N is generated based on a uniform distribution between 0 and a fixed contention window CW=3.

17. The method of claim 15, wherein the DCI format is at least one of:
 a DCI format 0_0 with a cyclic redundancy check (CRC) scrambled by: a cell radio network temporary identifier (C-RNTI), a configured scheduling radio network temporary identifier (CS-RNTI), a modulation coding scheme cell radio network temporary identifier (MCS-C-RNTI), or a temporary cell radio network temporary identifier (TC-RNTI); or
 a DCI format 0_1 with CRC scrambled by a C-RNTI, or a CS-RNTI, or a semi-persistent channel state information radio network temporary identifier (SP-CSI-RNTI), or a MCS-C-RNTI.

18. The method of claim 15, further comprising:
determining a number of bits for the field based on the DCI format, wherein:
when the DCI format is a DCI format 0_0, the number of bits for the field is fixed as 2; and
when the DCI format is a DCI format 0_1, the number of bits for the field is determined as $\lceil \log_2(I) \rceil$, wherein I is a number of channel access types configured by a higher layer parameter.

19. The method of claim 15, further comprising:
receiving a higher layer parameter from the BS,
wherein the higher layer parameter includes information on whether a set of uplink transmissions is exempt from performing a channel access procedure, and
wherein the set of uplink transmissions includes a message 1 (msg1) transmission in a 4-step random access procedure or a message A (msgA) transmission in a 2-step random access procedure.

20. The method of claim 19, further comprising:
determining a duty cycle for the set of uplink transmissions; and
transmitting the set of uplink transmissions without performing channel access procedure on the channel with shared spectrum channel access based on determining that the duty cycle for the set of uplink transmissions does not exceed a threshold.

* * * * *